US012794260B2

(12) United States Patent
Yu et al.

(10) Patent No.: US 12,794,260 B2
(45) Date of Patent: Nov. 10, 2026

(54) POWER CONVERTERS AND UNINTERRUPTIBLE POWER SUPPLIES (UPSS) INCLUDING THE SAME

(71) Applicant: Santak Electronic (Shenzhen) Co., Ltd., Shenzhen (CN)

(72) Inventors: Jingjin Yu, Shenzhen (CN); Yulong Hao, Shenzhen (CN); Dan Liu, Shenzhen (CN); Zhimin Shen, Shenzhen (CN); Pingchang Lin, Shenzhen (CN)

(73) Assignee: Santak Electronic (Shenzhen) Co., Ltd., Shenzhen (CN)

( * ) Notice: Subject to any disclaimer, the term of this patent is extended or adjusted under 35 U.S.C. 154(b) by 183 days.

(21) Appl. No.: 18/973,483

(22) Filed: Dec. 9, 2024

(65) Prior Publication Data

US 2025/0202380 A1 Jun. 19, 2025

(30) Foreign Application Priority Data

Dec. 14, 2023 (CN) ........................ 202311719990.X

(51) Int. Cl.
*H02J 9/06* (2006.01)
*H02M 1/00* (2006.01)
*H02M 3/335* (2006.01)
*H02M 7/219* (2006.01)

(52) U.S. Cl.
CPC ................ *H02J 9/061* (2013.01); *H02J 9/06* (2013.01); *H02M 1/007* (2021.05); *H02M 3/33584* (2013.01); *H02M 7/219* (2013.01)

(58) Field of Classification Search
CPC ............ H02J 9/06; H02J 9/061; H02M 1/007; H02M 3/33584; H02M 7/219
See application file for complete search history.

(56) References Cited

U.S. PATENT DOCUMENTS

| | | | | |
|---|---|---|---|---|
| 11,349,336 | B2 * | 5/2022 | Lai | H02J 9/062 |
| 2017/0117749 | A1 * | 4/2017 | Fang | H02M 7/219 |
| 2024/0171000 | A1 * | 5/2024 | Tsuruta | H02J 9/062 |
| 2024/0405597 | A1 * | 12/2024 | Zhang | H02J 9/061 |

* cited by examiner

*Primary Examiner* — Gary L Laxton
(74) *Attorney, Agent, or Firm* — Stanek Lemon Crouse & Meeks, PA

(57) ABSTRACT

A power converter and a UPS including the same are provided. The power converter includes first to third power conversion modules and a switch unit. The switch unit is configured to enable: a first terminal of the first power conversion module to be selectively electrically connected to a three-phase power supply or a neutral line, and first terminals of the second and third power conversion modules to be selectively electrically connected to the three-phase power supply or the rechargeable battery, where the first, second and third power conversion modules and the switch unit are configured to be capable of providing a direct current output by the rechargeable battery to the DC bus after performing DC-DC conversion on the direct current through both the second and third power conversion modules, and balancing a positive electrode and a negative electrode of the DC bus through the first power conversion module.

10 Claims, 5 Drawing Sheets

POWER CONVERTERS AND UNINTERRUPTIBLE POWER SUPPLIES (UPSS) INCLUDING THE SAME

CROSS-REFERENCE TO RELATED APPLICATION

This application claims priority to Chinese Patent Application No. CN 202311719990.X, filed Dec. 14, 2023, the content of which is hereby incorporated herein by reference in its entirety.

TECHNICAL FIELD

The present inventive concept belongs to the field of power supplies, and in particular, to a power converter and an uninterruptible power supply (UPS) including the power converter.

BACKGROUND

A UPS is used to instantaneously switch to providing continuous power to a load from a backup power supply (e.g., a rechargeable battery) when a primary power supply (e.g., a municipal power grid) is not in a normal state, to protect the load from damage due to power interruption of the primary power supply. The UPS typically includes an AC-DC conversion module (rectifier) that converts an alternating current into a direct current, a DC-AC conversion module (inverter) that converts a direct current into an alternating current, a backup power supply, a DC-DC conversion module (charger) that charges the backup power supply, and a DC-DC conversion module (battery converter) that performs direct current conversion on an output voltage of the backup power supply.

When the primary power supply is faulty, the UPS switches a system from operating with the primary power supply to operating with the backup power supply. When the primary power supply resumes operation, the UPS switches the system from operating with the backup power supply to operating with the primary power supply.

With continuous development of new energy sources (e.g., lithium batteries) and with continuous expansion of application scenarios of the new energy sources, more and more UPSs use the new energy sources as backup power supplies. This also put forward higher requirements for backup power supply modes of the UPSs. A conventional UPS generally uses a dedicated circuit module to implement functions such as AC-DC conversion, DC-DC conversion, and direct current bus balancing, so that the entire UPS has a low circuit utilization, a large volume, and high costs.

SUMMARY

Therefore, an objective of the present inventive concept is to overcome the foregoing disadvantages of the conventional technology and provide a power converter, including:

a first power conversion module, capable of being configured to implement AC-DC conversion, where a first terminal of the first power conversion module is configured to be electrically connected to a first phase of a three-phase power supply or a neutral line, and a second terminal of the first power conversion module is configured to be electrically connected to a direct current bus;

a second power conversion module, capable of being configured to implement AC-DC conversion, where a first terminal of the second power conversion module is configured to be electrically connected to a second phase of the three-phase power supply or a rechargeable battery, and a second terminal of the second power conversion module is configured to be electrically connected to the direct current bus;

a third power conversion module, capable of being configured to implement AC-DC conversion, where a first terminal of the third power conversion module is configured to be electrically connected to a third phase of the three-phase power supply or the rechargeable battery, and a second terminal of the third power conversion module is configured to be electrically connected to the direct current bus; and a switch unit, configured to enable the first terminal of the first power conversion module to be selectively electrically connected to the first phase of the three-phase power supply or the neutral line, enable the first terminal of the second power conversion module to be selectively electrically connected to the second phase of the three-phase power supply or a positive electrode of the rechargeable battery, and enable the first terminal of the third power conversion module to be selectively electrically connected to the third phase of the three-phase power supply or a negative electrode of the rechargeable battery, where the first power conversion module, the second power conversion module, the third power conversion module, and the switch unit are configured to be capable of providing a direct current output by the rechargeable battery to the direct current bus after performing DC-DC conversion on the direct current through both the second power conversion module and the third power conversion module, and balancing a positive electrode and a negative electrode of the direct current bus through the first power conversion module.

According to the power converter of the present inventive concept, preferably, the second power conversion module and the third power conversion module each include an inductor, an upper bridge arm unit, and a lower bridge arm unit, and are configured to perform DC-DC conversion through the upper bridge arm unit of the second power conversion module and the lower bridge arm unit of the third power conversion module.

According to the power converter of the present inventive concept, preferably, the first power conversion module is an I-type three-level circuit, and the second power conversion module and the third power conversion module each is a dual-boost circuit.

According to the power converter of the present inventive concept, preferably, the dual-boost circuit includes first to fourth diodes successively connected in series, first and second transistors connected in series with each other, and an inductor, where a negative electrode of the first diode is electrically connected to the positive electrode of the direct current bus, a node between a positive electrode of the first diode and a negative electrode of the second diode is electrically connected to a first terminal of the first transistor, a node between a positive electrode of the second diode and a negative electrode of the third diode is electrically connected to a first terminal of the inductor, a node between a positive electrode of the third diode and a negative electrode of the fourth diode is electrically connected to a second terminal of the second transistor, a positive electrode of the fourth diode is electrically connected to the negative electrode of the direct current bus, a node between a second terminal of the first transistor and a first terminal of the second transistor is electrically connected to the neutral line, and a second terminal of the inductor is electrically connected to the three-phase power supply or the rechargeable battery through the switch unit.

According to the power converter of the present inventive concept, preferably, the I-type three-level circuit includes first to fourth transistors successively connected in series, first and second diodes connected in series with each other, and an inductor, where a first terminal of the first transistor is electrically connected to the positive electrode of the direct current bus, a node between a second terminal of the first transistor and a first terminal of the second transistor is electrically connected to a negative electrode of the first diode, a node between a second terminal of the second transistor and a first terminal of the third transistor is electrically connected to a first terminal of the inductor, a node between a second terminal of the third transistor and a first terminal of the fourth transistor is electrically connected to a positive electrode of the second diode, a second terminal of the fourth transistor is electrically connected to the negative electrode of the direct current bus, a node between the first diode and the second diode is electrically connected to the neutral line, and a second terminal of the inductor is electrically connected to the three-phase power supply or the neutral line through the switch unit.

According to the power converter of the present inventive concept, preferably, output terminals of the first phase, the second phase, and the third phase of the three-phase power supply each is grounded through a capacitor.

According to the power converter of the present inventive concept, preferably, a fourth power conversion module is further included, capable of being configured to implement DC-DC conversion, where a first terminal of the fourth power conversion module is configured to be electrically connected to the rechargeable battery, and a second terminal of the fourth power conversion module is configured to be electrically connected to the direct current bus.

According to the power converter of the present inventive concept, preferably, the first terminal of the fourth power conversion module is electrically connected to the rechargeable battery through the switch unit.

According to the power converter of the present inventive concept, preferably, the fourth power conversion module is a bidirectional DC-DC circuit.

According to the power converter of the present inventive concept, preferably, the bidirectional DC-DC circuit includes first to third transistors and first and second inductors, where a first terminal of the first transistor is electrically connected to the positive electrode of the direct current bus, a node between a second terminal of the first transistor and a first terminal of the second transistor is electrically connected to a first terminal of the first inductor, a node between a second terminal of the second transistor and a first terminal of the third transistor is electrically connected to a first terminal of the second inductor, a second terminal of the third transistor is electrically connected to the negative electrode of the direct current bus, the first terminal of the first inductor is configured to be electrically connected to the positive electrode of the rechargeable battery, and the first terminal of the second inductor is configured to be electrically connected to the negative electrode of the rechargeable battery.

The present inventive concept further provides an uninterruptible power supply, including:

- the power converter according to the present inventive concept;
- an inverter, electrically connected to the direct current bus of the power converter; and
- a rechargeable battery, whose output terminals are electrically connected to the switch unit of the power converter.

Compared with the conventional technology, the power converter of the present inventive concept multiplexes rectifier bridge arms as a battery conversion bridge arm and a balance bridge arm, which greatly improves circuit utilization and battery power supply efficiency, reduces the volume of the power converter, and reduces costs.

BRIEF DESCRIPTION OF THE DRAWINGS

The following further describes the embodiments of the present inventive concept with reference to the accompanying drawings, where.

DETAILED DESCRIPTION

To make the objectives, technical solutions, and advantages of the present inventive concept clearer, the following further describes the present inventive concept in detail through the embodiments with reference to the accompanying drawings. It should be understood that the embodiments described herein are only used to explain the present inventive concept, but are not intended to limit the present inventive concept.

Figure 1:
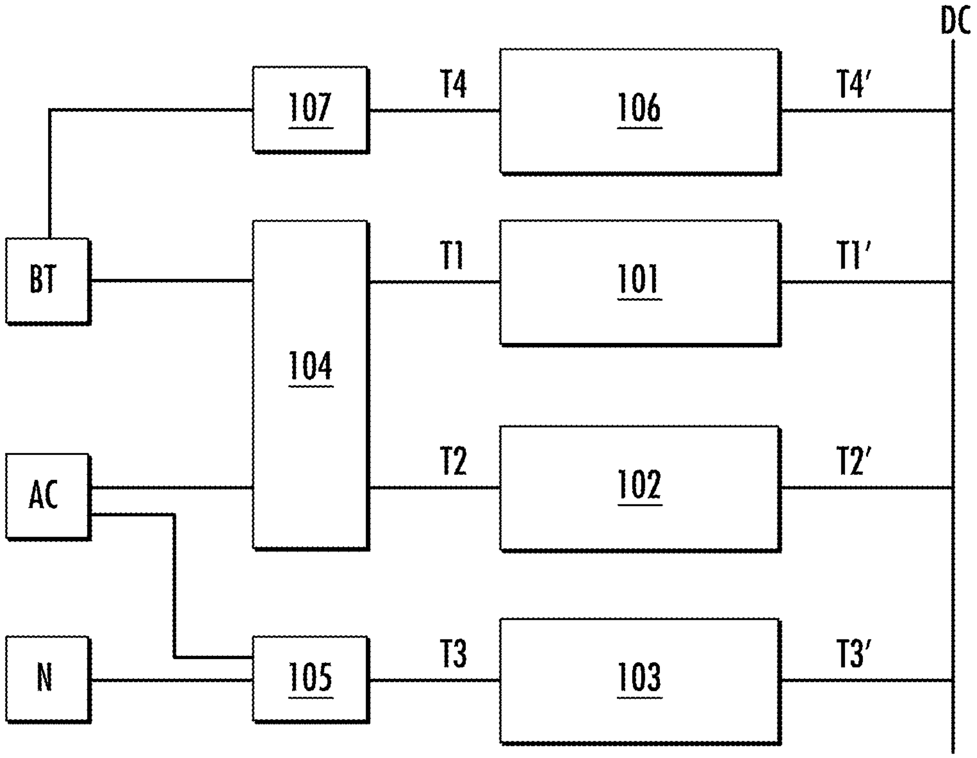
FIG. 1 is a schematic block diagram of a power converter according to some embodiments of the present inventive concept.

FIG. 1 shows a schematic block diagram of a power converter according to some embodiments of the present inventive concept. The power converter includes a first power conversion module 101, a second power conversion module 102, a third power conversion module 103, a first switch module 104, and a second switch module 105. The first switch module 104 is arranged between first terminals T1 and T2 of the first power conversion module 101 and the second power conversion module 102 and both a mains supply AC and a rechargeable battery BT, and is configured to enable the first terminal T1 of the first power conversion module 101 and the first terminal T2 of the second power conversion module 102 to be selectively electrically connected to the mains supply AC and/or the rechargeable battery BT. The second switch module 105 is arranged between a first terminal T3 of the third power conversion module 103 and both the mains supply AC and a neutral line N. Second terminals T1', T2', and T3' of the first to third power conversion modules 101, 102, and 103 are configured to be electrically connected to a direct current bus DC. Preferably, the power converter in the embodiment of the present inventive concept further includes a fourth power conversion module 106 and a fourth switch module 107. The fourth switch module 107 is arranged between a first terminal T4 of the fourth power conversion module 106 and the rechargeable battery BT, and a second terminal T4' of the fourth power conversion module 106 is configured to be electrically connected to the direct current bus DC. The power converter in the embodiment of the present inventive concept is configured to implement different operating modes, including a mains supply mode and a battery mode. When the mains supply is normal, operating logics of the first to third power conversion modules 101-103 and switching logics of the first and second switch modules 104-105 are controlled, so that all the first terminals of the first to third power conversion module 101-103 draw power from the mains supply and provide the power to the second terminals after separately performing AC-DC conversion on the power, and then the power is supplied to a load. In this case, if the rechargeable battery BT is underpowered, the fourth power conversion module 106 draws power from the direct current bus to charge the rechargeable battery BT. When the rechargeable battery BT is fully charged, the fourth power conversion module 106 does not operate. When the mains supply is faulty, the operating logics of the first and second power conversion modules 101 and 102 and the switching logic of the first switch module 104 are controlled, so that the first and second power conversion modules 101 and 102 jointly perform DC-DC conversion on an output of the rechargeable battery BT to supply power to the direct current bus DC. In this way, when the mains supply is faulty, rectifier modules are multiplexed as a battery conversion module to supply power to the load from a battery, thereby avoiding idling of the rectifier modules, improving circuit utilization, and reducing the volume and costs of the power converter. In this case, preferably, the operating logic of the third power conversion module 103 and the switching logic of the third switch module 105 are controlled, so that the third power conversion module 103 serves as a balance branch for implementing balance of the direct current bus DC. In this way, no dedicated balance circuit needs to be disposed, thereby further improving the circuit utilization, and further reducing the volume and costs of the power converter. More preferably, the fourth power conversion module 106 also serves as a battery conversion branch, to implement DC-DC conversion from the rechargeable battery BT to the direct current bus, thereby greatly improving battery power supply efficiency, reducing a full load rate of a battery bridge arm, generally requiring only a full load rate design of about 50%, and significantly reducing the costs and volume.

Figure 2:
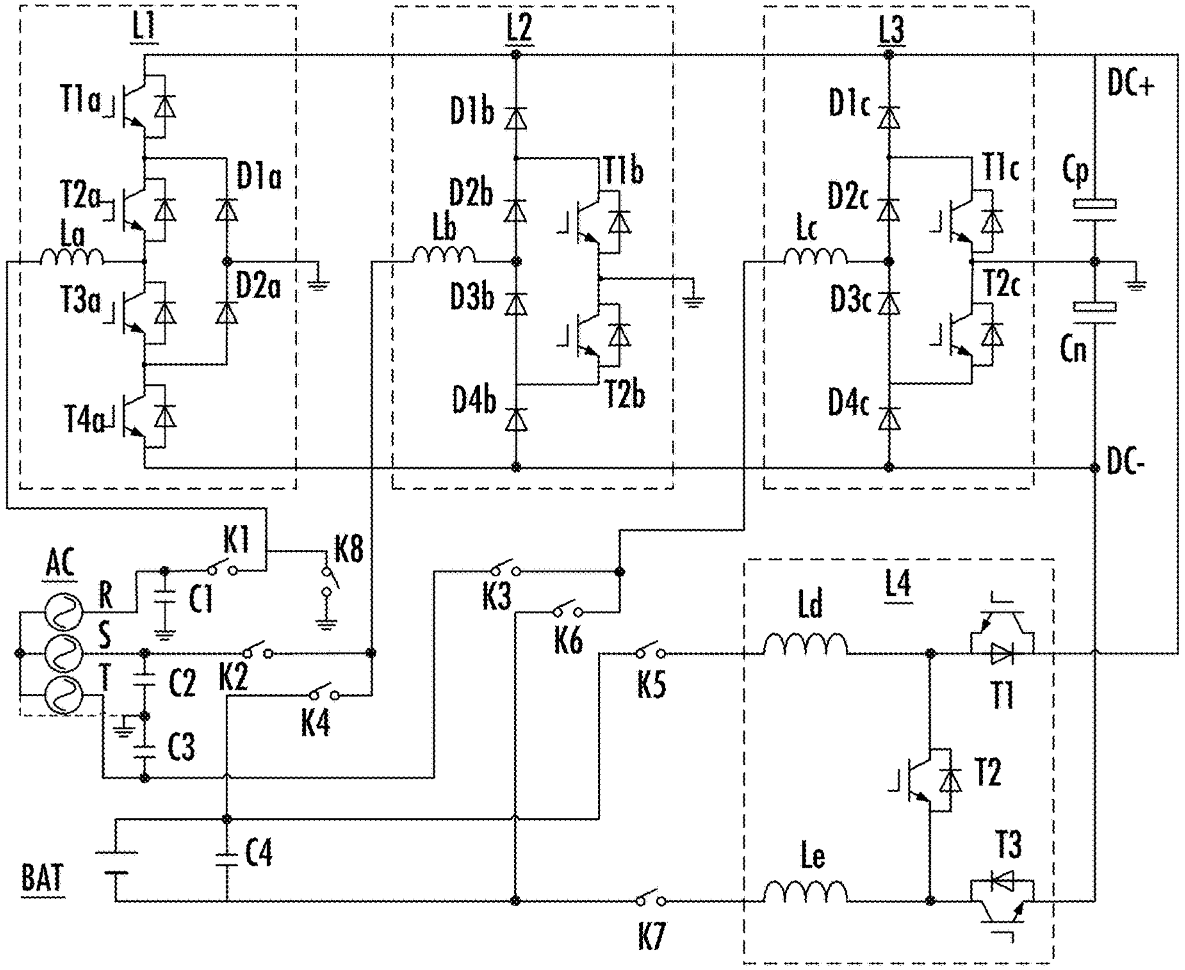
FIG. 2 is a circuit topology of a power converter according to some embodiments of the present inventive concept.

Referring to FIG. 2, a circuit topology of a power converter according to some embodiments of the present inventive concept, the circuit topology is configured to be capable of being electrically connected to a three-phase alternating current power supply AC and a direct current power supply (for example, a rechargeable battery) BAT. The circuit topology shown in FIG. 2 includes four bridge arms. The bridge arms L1-L3 are rectifier bridge arms, and the bridge arm LA is a bidirectional DC/DC conversion bridge arm. Specifically, in this embodiment, the bridge arm L1 is an I-type three-level circuit, the bridge arm L2 and the bridge arm L3 each is a dual-boost circuit, and the bridge arm L4 is a bidirectional DC/DC conversion circuit.

As shown in FIG. 2, the I-type three-level circuit of the first bridge arm L1 includes first to fourth transistors T1*a*, T2*a*, T3*a*, and T4*a* successively connected in series, first and second diodes D1*a* and D2*a* that are connected in series with each other, and a first inductor La, where a first terminal of the first transistor T1*a* is electrically connected to a positive direct current bus DC+, a node between a second terminal of the first transistor T1*a* and a first terminal of the second transistor T2*a* is connected to a negative electrode of the first diode D1*a*, a node between a second terminal of the second transistor T2*a* and a first terminal of the third transistor T3*a* is connected to a first terminal of the first inductor La, a node between a second terminal of the third transistor T3*a* and a first terminal of the fourth transistor T4*a* is connected to a positive electrode of the second diode D2*a*, a second terminal of the fourth transistor T4*a* is electrically connected to a negative direct current bus DC−, a node between a positive terminal of the first diode D1*a* and a negative terminal of the second transistor T2*a* is grounded, a second terminal of the first inductor La is electrically connected to a first phase R of the three-phase alternating current power supply AC through a relay K1, a node between the relay K1 and the first inductor La is grounded through a relay K8, and a node between the relay K1 and the first phase R of the three-phase alternating current power supply AC is grounded through a capacitor C1. In addition, anti-parallel diodes are respectively built in the first to fourth transistors T1*a*-T4*a*.

The dual-boost circuit of the second bridge arm L2 includes first to fourth diodes D1*b*-D4*b* successively connected in series, first and second transistors T1*b* and T2*b* connected in series with each other, and a second inductor Lb, where a negative electrode of the first diode D1*b* is electrically connected to the positive direct current bus DC+, a positive electrode of the first diode D1*b* is electrically connected to a first terminal of the first transistor T1*b* and a negative electrode of the second diode D2*b*, a positive electrode of the second diode D2*b* is electrically connected to a first terminal of the second inductor Lb and a negative electrode of the third diode D3*b*, a positive electrode of the third diode D3*b* is electrically connected to a second terminal of the second transistor T2*b* and a negative electrode of the fourth diode D4*b*, a positive electrode of the fourth diode D4*b* is electrically connected to the negative direct current bus DC−, a node between a second terminal of the first transistor T1*b* and a first terminal of the second transistor T2*b* is grounded, and a second terminal of the second inductor Lb is connected to a second phase S of the three-phase alternating current power supply AC through a relay K2, and is connected to the positive electrode of the battery BAT through a relay K4. Likewise, anti-parallel diodes are respectively built in the first transistor T1*b* and the second transistor T2*b*. It is clear from FIG. 2 that the diodes D1*b* and D2*b* and the transistor T1*b* constitute an upper bridge arm unit of the second bridge arm L2, and the diodes D3*b* and D4*b* and the transistor T2*b* constitute a lower bridge arm unit of the second bridge arm L2.

The dual-boost circuit of the third bridge arm L3 includes first to fourth diodes D1*c*-D4*c* successively connected in series, first and second transistors T1*c* and T2*c* connected in series with each other, and a third inductor Lc, where a negative electrode of the first diode D1*c* is electrically connected to the positive direct current bus DC+, a positive electrode of the first diode D1*c* is electrically connected to a first terminal of the first transistor T1*c* and a negative electrode of the second diode D2*c*, a positive electrode of the second diode D2*c* is electrically connected to a first terminal of the third inductor Lc and a negative electrode of the third diode D3*c*, a positive electrode of the third diode D3*c* is electrically connected to a second terminal of the second transistor T2*c* and a negative electrode of the fourth diode D4*c*, a positive electrode of the fourth diode D4*c* is electrically connected to the negative direct current bus DC−, a node between a second terminal of the first transistor T1*c* and a first terminal of the second transistor T2*c* is grounded, and a second terminal of the third inductor Lc is connected to a third phase T of the three-phase alternating current power supply AC through a relay K3, and is connected to the negative electrode of the battery BAT through a relay K6. Likewise, anti-parallel diodes are respectively built in the first transistor T1*c* and the second transistor T2*c*. Similarly, the diodes D1*c* and D2*c* and the transistor T1*c* constitute an upper bridge arm unit of the third bridge arm L3, and the diodes D3*c* and D4*c* and the transistor T2*c* constitute a lower bridge arm unit of the third bridge arm L3.

The bidirectional DC/DC conversion circuit of the fourth bridge arm L4 includes first to third transistors T1-T3, and first and second inductors Ld and Le, where a first terminal of the first transistor T1 is electrically connected to the positive direct current bus DC+, a node between a second terminal of the first transistor T1 and a first terminal of the second transistor T2 is connected to a first terminal of the first inductor Ld, a node between a second terminal of the second transistor T2 and a first terminal of the third transistor T3 is connected to a first terminal of the second inductor Le, a second terminal of the third transistor T3 is electrically connected to the negative direct current bus DC−, a second terminal of the first inductor Ld is electrically connected to the positive electrode of the battery BAT through a relay K5, a second terminal of the second inductor Le is electrically connected to the negative electrode of the battery BAT through a relay K7, and a filter capacitor C4 is connected in parallel between two electrodes of the battery BAT. Likewise, anti-parallel diodes are respectively built in the first to third transistors T1-T3.

Capacitors C2 and C3 that are connected in series with each other are connected between output terminals of the second phase S and the third phase T of the three-phase alternating current power supply AC, and a node between the two capacitors is grounded.

A first capacitor Cp and a second capacitor Cn are connected in series between the positive direct current bus DC+ and the negative direct current bus DC−, and a node between the first capacitor Cp and the second capacitor Cn is grounded.

In the embodiment of the present inventive concept, the dual-boost circuits of the second bridge arm L2 and the third bridge arm L3 use fewer transistors than the I-type three-level circuit of the first bridge arm L1, thereby reducing the volume and the costs.

Figure 3:
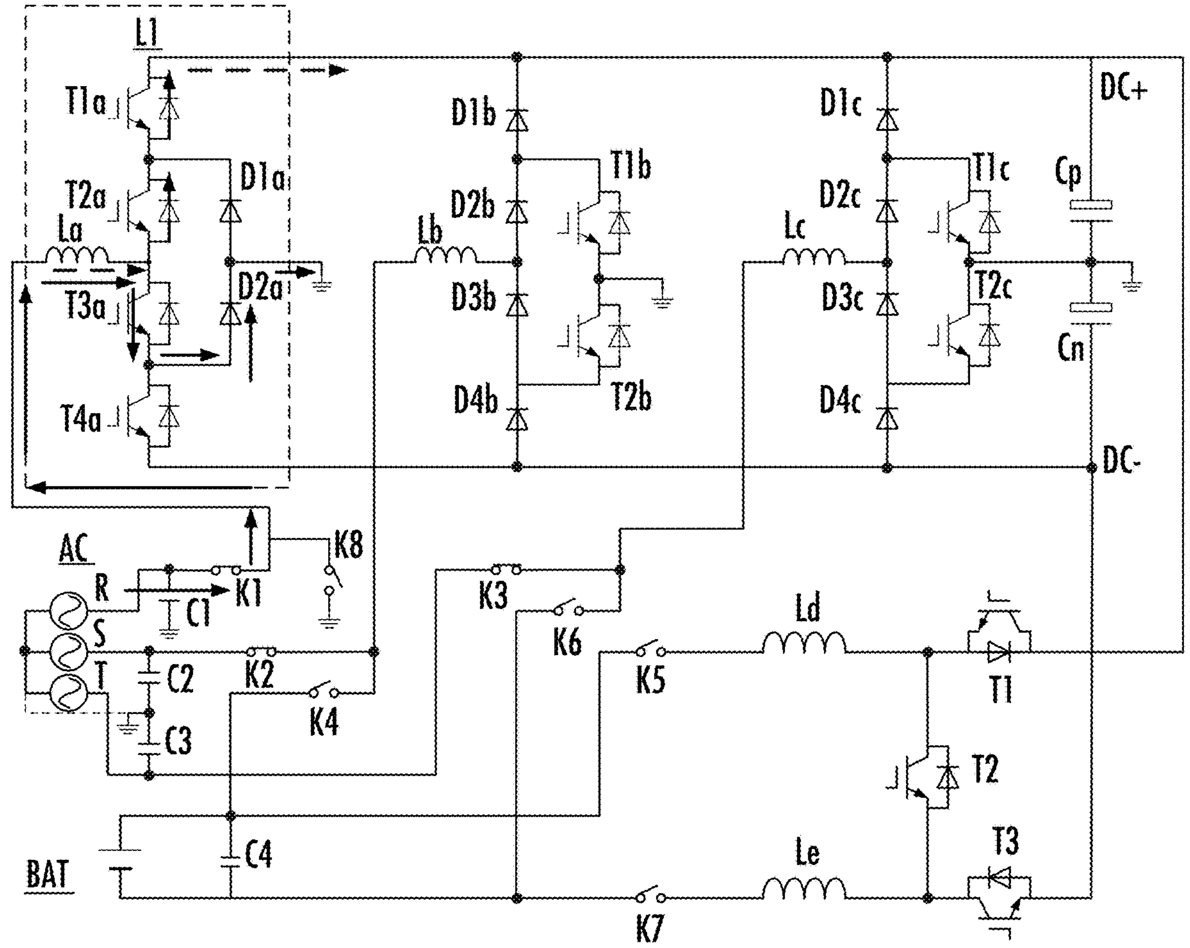
FIG. 3 and FIG. 4 respectively show current paths of a power converter in a mains supply mode and a battery mode according to some embodiments of the present inventive concept.
Figure 4:
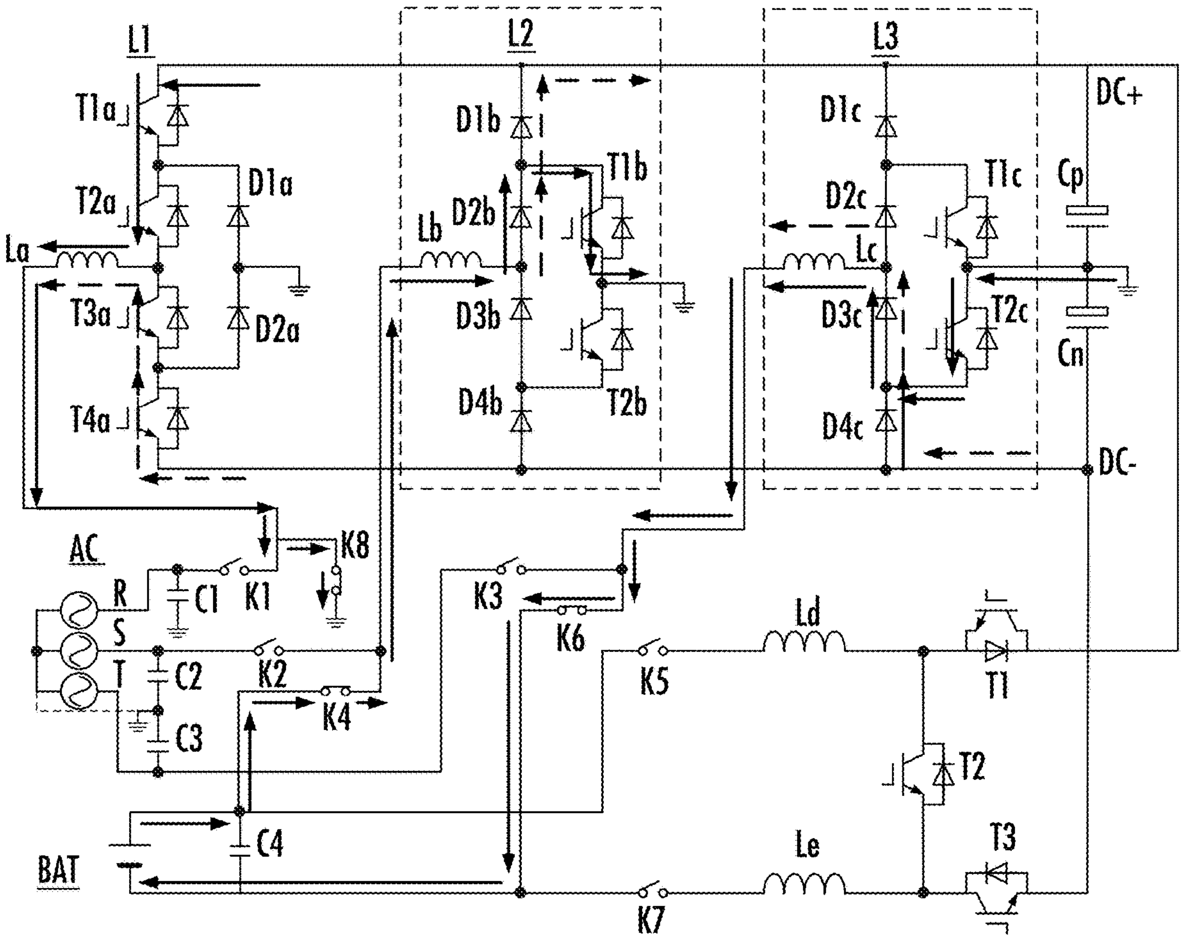

The following discusses, with reference to FIG. 3 and FIG. 4, operating modes of the power converter shown in FIG. 2.

Mains supply mode (the mains supply operates normally): As shown in FIG. 3, relays K1, K2 and K3 are switched on, and relays K8, K4 and K6 are switched off.

When a mains voltage is in a positive half cycle, particularly, a voltage of each phase of the three-phase alternating current power supply AC is in the positive half cycle:

For the first rectifier bridge arm L1, when T3*a* is switched on and T1*a*, T2*a*, and T4*a* are switched off, the first inductor La stores energy. A current path is: AC (R)→K1→La→T3*a*→D2*a*→neutral line N (grounded), as shown by solid line arrows in FIG. 3.

After energy storage is completed, T1*a*, T2*a*, T3*a*, and T4*a* are switched off, and the inductor La releases energy to the direct current link capacitors Cp and Cn. A current path is: La→D (T2*a*)→D (T1*a*)→DC+→Cp→neutral line N (grounded), as shown by dashed line arrows in FIG. 3. This process is actually a process of continuation of an inductor current after the transistors are switched off.

For the second rectifier bridge arm L2, when T1*b* is switched on and T2*b* is switched off, the second inductor Lb stores energy. A current path is: AC(S)→K2→Lb→D2*b*→T1*b*→neutral line N (grounded).

After energy storage is completed, T1*b* and T2*b* are switched off, and the inductor Lb releases energy to the direct current link capacitors Cp and Cn. A current path is: Lb→D2*b*→D1*b*→DC+→Cp→neutral line N (grounded). This process is also a process of continuation of an inductor current after the transistors are switched off.

Similarly, for the third bridge arm L3, when T1*c* is switched on and T2*c* is switched off, the third inductor Lc stores energy. A current path is: AC (T)→K3→Lc→D2*c*→T1*c*→neutral line N (grounded).

After energy storage is completed, T1*c* and T2*c* are switched off, and the inductor Lc releases energy to the direct current link capacitors Cp and Cn. A current path is: Lc→D2*c*→D1*c*→DC+→Cp→neutral line N (grounded). This process is a process of continuation of an inductor current after the transistors are switched off. For clarity, current paths for the second bridge arm L2 and the third bridge arm L3 are not shown in FIG. 3.

When the mains voltage is in a negative half cycle, particularly, the voltage of each phase of the three-phase alternating current power supply AC is in the negative half cycle:

For the first rectifier bridge arm L1, when T2*a* is switched on and T1*a*, T3*a*, and T4*a* are switched off, the first inductor La stores energy. A current path is: neutral line N (grounded)→D1*a*→T2*a*→La→K1→AC (R).

After energy storage is completed, when T1*a*, T2*a*, T3*a*, and T4*a* are switched off, the inductor La releases energy to the direct current link capacitors Cp and Cn. A current path is: neutral line N (grounded)→Cn→DC−→D (T4*a*)→D (T3*a*)→La. This process is actually a process of continuation of an inductor current after the transistors are switched off.

For the second rectifier bridge arm L2, when T2*b* is switched on and T1*b* is switched off, the second inductor Lb stores energy. A current path is: neutral line N (grounded)→T2*b*→D3*b*→Lb→K2→AC(S).

After energy storage is completed, T1*b* and T2*b* are switched off, and the inductor Lb releases energy to the direct current link capacitors Cp and Cn. A current path is: neutral line N (grounded)→Cn→DC−→D4*b*→D3*b*→Lb. This process is also a process of continuation of an inductor current after the transistors are switched off.

Similarly, for the third bridge arm L3, when T2*c* is switched on and T1*c* is switched off, the third inductor Lc stores energy. A current path is: neutral line N (grounded)→T2*c*→D3*c*→Lc→K3→AC (T).

After energy storage is completed, T1*c* and T2*c* are switched off, and the inductor Lc releases energy to the direct current link capacitors Cp and Cn. A current path is: neutral line N (grounded)→Cn→DC−→D4*c*→D3*c*→Lc. This process is also a process of continuation of an inductor current after the transistors are switched off.

In addition, in the mains supply mode, when the battery BAT is underpowered, the relays K5 and K7 are switched on, and the direct current buses DC+ and DC-charge the battery BAT. When the transistors T1 and T3 are switched on and the transistor T2 is switched off, the direct current buses store energy for the inductors Ld and Le, and a current path is: DC+→T1→Ld→K5→BAT→K7→Le→T3→DC−. After energy storage is completed, the transistors T1 and T3 are switched off, the transistor T2 is switched on, the inductors Ld and Le release energy with a current path Ld→K5→BAT→K7→Le→T2, to continue charging the battery BAT. This process is also a process of continuation of an inductor current.

In a battery mode (when the mains supply is faulty), the power converter is disconnected from the mains supply AC and is powered only by the battery BAT. As shown in FIG. 4, relays K8, K4, and K6 are switched on, and relays K1, K2, and K3 are switched off.

When T1*b* and T2*c* are switched on and T2*b* and T1*c* are switched off, the inductors Lb and Lc store energy, and a current path is:

BAT+→K4→Lb→D2*b*→T1*b*→T2*c*→D3*c*→Lc→K6→BAT−, as shown by solid line arrows in FIG. 4.

When T1*b*, T2*b*, T1*c*, and T2*c* are all switched off, the inductors Lb and Lc release energy, and a current path is:

BAT+→K4→Lb→D2*b*→D1*b*→DC+→Cp→Cn→DC−→D4*c*→D3*c*→Lc→K6→BAT−, as shown by dashed line arrows in FIG. 4.

In this way, the battery BAT supplies power to the direct current buses. The second bridge arm L2 and the third bridge arm L3 jointly (for example, through the upper bridge arm unit of the second bridge arm L2 and the lower bridge arm unit of the third bridge arm L3) implement DC-DC conversion, thereby improving circuit utilization.

Generally, all loads cannot be completely balanced. Especially, for a three-phase power supply, if only single-phase loads are connected, the system can become very unbalanced. In this case, it is necessary to control balance of the positive and negative direct current buses. In the battery mode, preferably, the I-type three-level circuit of the first bridge arm L1 is used as a balance branch, transistors and alternating conduction thereof of the first bridge arm L1 are controlled, so that the balance of the direct current buses can be implemented. Specifically, if a voltage of the capacitor Cp is higher than that of the capacitor Cn, when the transistors T1*a* and T2*a* are switched on and the transistors T3*a* and T4*a* are switched off, the inductor La stores energy, and a current path is: DC+→T1*a*→T2*a*→La→K8→neutral line (ground wire)→Cp, as shown by solid line arrows in FIG. 4. After energy storage of La is completed, the transistors T1*a* and T2*a* are switched off, the transistors T3*a* and T4*a* are switched on, La freewheels to release energy, and a current path is: neutral line (ground wire)→Cn→DC−→T4*a*→T3*a*→La→K8, as shown by dashed line arrows in FIG. 4. That is, when the voltage of Bus+ (Cp) is higher than that of Bus− (Cn), the capacitor Cp discharges to store energy for the inductor La, and the inductor La freewheels to release energy to the capacitor Cn. Similarly, if the voltage of the capacitor Cn is higher than that of the capacitor Cp, when the transistors T3*a* and T4*a* are switched on and the transistors T1*a* and T2*a* are switched off, the inductor La stores energy, and a current path is: neutral line (ground wire)→K8→La→T3*a*→T4*a*→DC−→Cn. After energy storage of La is completed, the transistors T3*a* and T4*a* are switched off, the transistors T1*a* and T2*a* are switched on, La freewheels to release energy, and a current path is: neutral line (ground wire)→K8→La→T2*a*→T1*a*→DC+→Cp. That is, when the voltage of Bus+ (Cn) is higher than that of Bus− (Cp), the capacitor Cn discharges to store energy for the inductor La, and the inductor La freewheels to release energy to the capacitor Cp. In this way, the balance of the positive and negative direct current buses can be implemented. Preferably, two sets of transistors (T1*a*, T2*a*) and (T3*a*, T4*a*) are alternately switched on at a duty cycle of 50%.

In addition, considering that switches are needed for multiplexing rectifier bridge arms as a battery conversion bridge arm, this takes time, typically switching time on the order of 10 ms, for example, 20 ms. To ensure continuity of power supply, in the battery mode, the battery further performs DC-DC conversion through the fourth bridge arm L4 to supply power to the direct current buses. Specifically, the relays K5 and K7 are switched on.

When T1 and T3 are switched off and T2 is switched on, the inductors Ld and Le store energy, and a current path is: BAT+→K5→Ld→T2→Le→K7→BAT−.

When T2 is switched off and T1 and T3 are switched on, the capacitor C4 and the inductors Ld and Le release energy, and a current path is: BAT+→K5→Ld→D (T1)→DC+→Cp→Cn→DC−→D (T3)→Le→K7→BAT−.

In this way, the battery BAT supplies power to the direct current buses through the second bridge arm, the third bridge arm, and the fourth bridge arm together, thereby greatly improving battery power supply efficiency, reducing a full load rate of a battery bridge arm, generally requiring only a full load rate design of about 50%, and significantly reducing the costs and volume. Preferably, in this operating mode, the fourth bridge arm is interleaved in parallel with a multiplexed battery bridge arm formed by the second bridge arm and the third bridge arm, thereby reducing ripples. More preferably, another battery bridge arm is further disposed in the power converter in the embodiment of the present inventive concept. As shown by a dashed line below the T phase in FIG. 3, a plurality of battery bridge arms are interleaved in parallel to supply power to the direct current buses, thereby further reducing a ripple current.

In addition, the power converter in the embodiment of the present inventive concept further resolves a disadvantage that a battery of a dual-boost circuit in the conventional technology needs to have a neutral line. In the dual-boost circuit in the conventional technology, a positive electrode and a negative electrode of the battery are respectively independent of each other during discharging. To balance positive and negative direct current buses in the battery mode, a neutral line needs to be led out at a middle point of a battery pack, a corresponding quantity of batteries connected in series must be an even number, and a quantity of transistors must also be increased. In the embodiment of the present inventive concept, the first bridge arm L1 is multiplexed as a balance bridge arm to balance the positive and negative direct current buses in the battery mode, there is no requirement on the quantity of batteries, and field application is not limited, thereby reducing costs.

Figure 5:
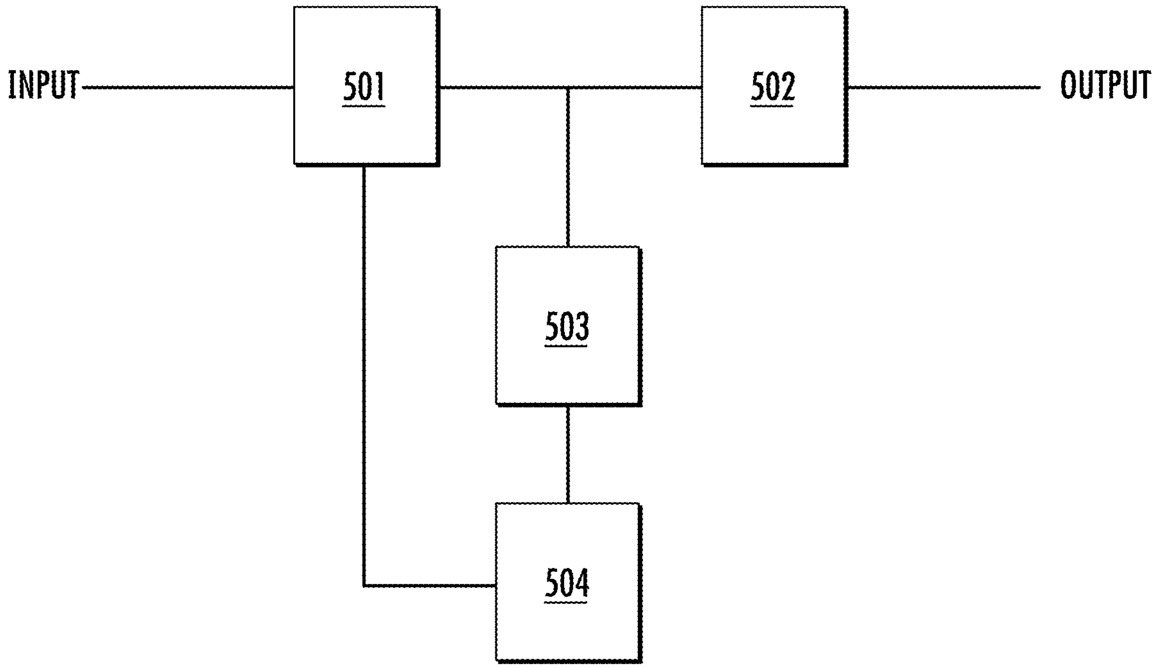
FIG. 5 is a structural block diagram of an uninterruptible power supply (UPS) according to some embodiments of the present inventive concept.

Another embodiment of the present inventive concept provides a UPS. Referring to a structural block diagram of the UPS in this embodiment shown in FIG. 5, the UPS includes a power converter 501, an inverter 502, a battery charging module 503, and a battery module 504. Compared with a conventional UPS, the power converter 501 of the UPS in this embodiment can perform DC-DC conversion on an output of the battery module 504 and then provide the output to a direct current bus, omitting a dedicated battery conversion module, reducing a volume of the UPS, and saving costs.

Figure 6:
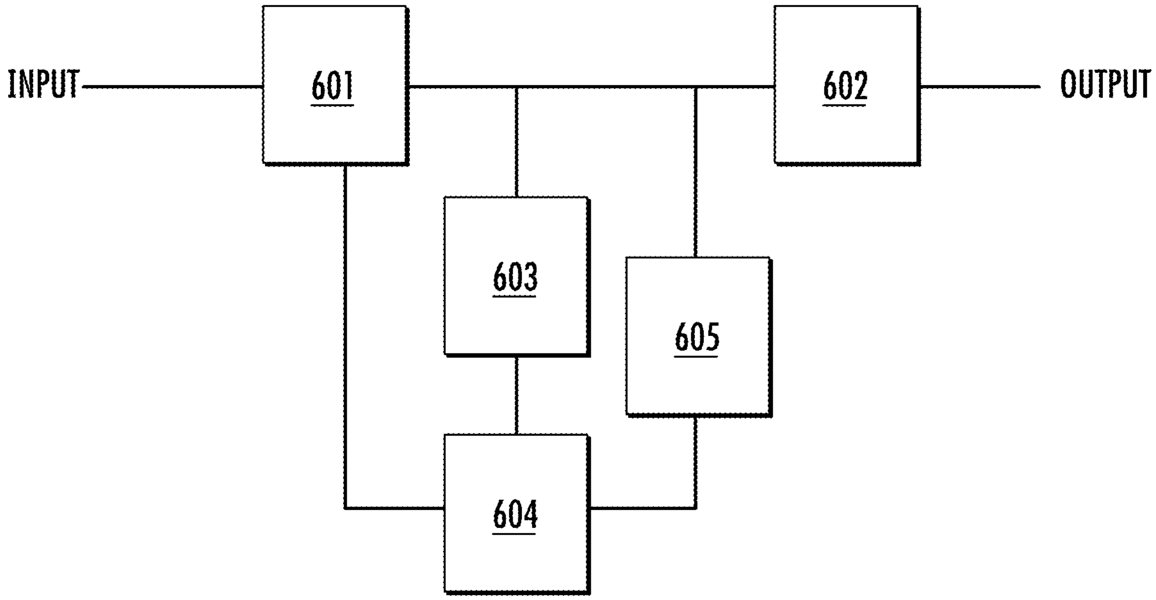
FIG. 6 is a structural block diagram of a UPS according to some embodiments of the present inventive concept.

Another embodiment of the present inventive concept provides another UPS. Referring to a structural block diagram of the UPS in this embodiment shown in FIG. 6, the UPS includes a power converter 601, an inverter 602, a battery charging module 603, a battery module 604, and a battery conversion module 605. Compared with a conventional UPS, the UPS in this embodiment can supply power from the battery module 604 to a direct current bus by using both the battery conversion module 605 and the power converter 601, thereby improving battery power supply efficiency. Preferably, the battery charging module 603 and the battery conversion module 605 are replaced with a bidirectional DC-DC conversion module, thereby reducing a volume of the UPS and saving costs.

The power converter in the embodiments of the present inventive concept can implement different operating modes by controlling switches. Therefore, the UPS in the embodiments of the present inventive concept can directly convert a battery output by rectifier bridge arms or a battery conversion bridge arm to supply power to the direct current bus at low load, and convert the battery output by both the rectifier bridge arms and the battery conversion bridge arm to supply power to the direct current bus at high load. Therefore, the UPS in the present inventive concept has a wider range of application scenarios.

According to other embodiments of the present inventive concept, a relay may be replaced with a well-known switching element in the art, for example, a mechanical switch, a circuit breaker, or the like. In addition, switch components (K1, K8), (K2, K4), and (K3, K6) may be replaced with single-pole double-throw switches.

According to other embodiments of the present inventive concept, the transistor is an IGBT, a MOSFET, or the like.

According to other embodiments of the present inventive concept, the first to the third switch modules constitute a switch unit.

Although the present inventive concept has been described by using embodiments, the present inventive concept is not limited to the embodiments described herein, and includes various changes and variations without departing from the scope of the present inventive concept.

What is claimed is:

1. A power converter, comprising:

a first power conversion module, capable of being configured to implement AC-DC conversion, wherein a first terminal of the first power conversion module is configured to be electrically connected to a first phase of a three-phase power supply or a neutral line, and a second terminal of the first power conversion module is configured to be electrically connected to a direct current bus;

a second power conversion module, capable of being configured to implement AC-DC conversion, wherein a first terminal of the second power conversion module is configured to be electrically connected to a second phase of the three-phase power supply or a rechargeable battery, and a second terminal of the second power conversion module is configured to be electrically connected to the direct current bus;

a third power conversion module, capable of being configured to implement AC-DC conversion, wherein a first terminal of the third power conversion module is configured to be electrically connected to a third phase of the three-phase power supply or the rechargeable battery, and a second terminal of the third power conversion module is configured to be electrically connected to the direct current bus; and a switch unit, configured to enable the first terminal of the first power conversion module to be selectively electrically connected to the first phase of the three-phase power supply or the neutral line, enable the first terminal of the second power conversion module to be selectively electrically connected to the second phase of the three-phase power supply or a positive electrode of the rechargeable battery, and enable the first terminal of the third power conversion module to be selectively electrically connected to the third phase of the three-phase power supply or a negative electrode of the rechargeable battery, wherein the first power conversion module, the second power conversion module, the third power conversion module, and the switch unit are configured to be capable of providing a direct current output by the rechargeable battery to the direct current bus after performing DC-DC conversion on the direct current through both the second power conversion module and the third power conversion module, and balancing a positive electrode and a negative electrode of the direct current bus through the first power conversion module.

2. The power converter of claim 1, wherein the second power conversion module and the third power conversion module each comprise an inductor, an upper bridge arm unit, and a lower bridge arm unit, and are configured to perform DC-DC conversion through the upper bridge arm unit of the second power conversion module and the lower bridge arm unit of the third power conversion module.

3. The power converter of claim 2, wherein the first power conversion module is an I-type three-level circuit, and the second power conversion module and the third power conversion module each is a dual-boost circuit.

4. The power converter of claim 3, wherein the dual-boost circuit comprises first to fourth diodes successively connected in series, first and second transistors connected in series with each other, and an inductor, wherein a negative electrode of the first diode is electrically connected to the positive electrode of the direct current bus, a node between a positive electrode of the first diode and a negative electrode of the second diode is electrically connected to a first terminal of the first transistor, a node between a positive electrode of the second diode and a negative electrode of the third diode is electrically connected to a first terminal of the inductor, a node between a positive electrode of the third diode and a negative electrode of the fourth diode is electrically connected to a second terminal of the second transistor, a positive electrode of the fourth diode is electrically connected to the negative electrode of the direct current bus, a node between a second terminal of the first transistor and a first terminal of the second transistor is electrically connected to the neutral line, and a second terminal of the inductor is electrically connected to the three-phase power supply or the rechargeable battery through the switch unit.

5. The power converter of claim 3, wherein the I-type three-level circuit comprises first to fourth transistors successively connected in series, first and second diodes connected in series with each other, and an inductor, wherein a first terminal of the first transistor is electrically connected to the positive electrode of the direct current bus, a node between a second terminal of the first transistor and a first terminal of the second transistor is electrically connected to a negative electrode of the first diode, a node between a second terminal of the second transistor and a first terminal of the third transistor is electrically connected to a first terminal of the inductor, a node between a second terminal of the third transistor and a first terminal of the fourth transistor is electrically connected to a positive electrode of the second diode, a second terminal of the fourth transistor is electrically connected to the negative electrode of the direct current bus, a node between the first diode and the second diode is electrically connected to the neutral line, and a second terminal of the inductor is electrically connected to the three-phase power supply or the neutral line through the switch unit.

6. The power converter of claim 1, wherein output terminals of the first phase, the second phase, and the third phase of the three-phase power supply each is grounded through a capacitor.

7. The power converter of claim 1, further comprising a fourth power conversion module, capable of being configured to implement DC-DC conversion, wherein a first terminal of the fourth power conversion module is configured to be electrically connected to the rechargeable battery, and a second terminal of the fourth power conversion module is configured to be electrically connected to the direct current bus.

8. The power converter of claim 7, wherein the first terminal of the fourth power conversion module is electrically connected to the rechargeable battery through the switch unit.

9. The power converter of claim 7, wherein the fourth power conversion module is a bidirectional DC-DC circuit.

10. An uninterruptible power supply, comprising:

the power converter of claim 1;

an inverter, electrically connected to the direct current bus of the power converter; and a rechargeable battery, whose output terminals are electrically connected to the switch unit of the power converter.

* * * * *